United States Patent [19]
Zuravleff et al.

[11] Patent Number: 5,630,096
[45] Date of Patent: May 13, 1997

[54] CONTROLLER FOR A SYNCHRONOUS DRAM THAT MAXIMIZES THROUGHPUT BY ALLOWING MEMORY REQUESTS AND COMMANDS TO BE ISSUED OUT OF ORDER

[75] Inventors: William K. Zuravleff, Mountainview; Timothy Robinson, Boulder Creek, both of Calif.

[73] Assignee: Microunity Systems Engineering, Inc., Sunnyvale, Calif.

[21] Appl. No.: 437,975

[22] Filed: May 10, 1995

[51] Int. Cl.⁶ .................................................. G06F 13/00
[52] U.S. Cl. ........................... 395/481; 364/DIG. 1; 365/233; 395/432; 395/477; 395/478; 395/485; 395/494; 395/496
[58] Field of Search ........................... 365/233; 395/432, 395/477, 478, 481, 485, 494, 496

[56] References Cited

U.S. PATENT DOCUMENTS

| | | |
|---|---|---|
| 4,685,088 | 8/1987 | Iannucci . |
| 4,691,302 | 9/1987 | Mattanusch . |
| 4,734,888 | 3/1988 | Tielert . |
| 4,740,924 | 4/1988 | Tielert . |
| 4,790,418 | 12/1988 | Masterson . |
| 5,077,693 | 12/1991 | Hardee et al. . |
| 5,179,667 | 1/1993 | Iyer . |
| 5,193,193 | 3/1993 | Iyer . |
| 5,253,214 | 10/1993 | Herrmann . |
| 5,253,357 | 10/1993 | Allen et al. . |
| 5,276,856 | 1/1994 | Norsworthy et al. . |
| 5,278,967 | 1/1994 | Curran . |
| 5,283,877 | 2/1994 | Gastinel et al. . |
| 5,287,327 | 2/1994 | Takasugi . |
| 5,301,278 | 4/1994 | Bowater et al. . |
| 5,311,483 | 5/1994 | Takasugi . |
| 5,381,536 | 1/1995 | Phelps et al. ............. 395/375 |
| 5,513,148 | 4/1996 | Zagar ......................... 365/233 |

FOREIGN PATENT DOCUMENTS 549139  6/1993  European Pat. Off. .

OTHER PUBLICATIONS

IBM Technical Disclosure Bulletin, vol. 33, No. 6A, pp. 269–272, Nov. 1990.
IBM Technical Disclosure Bulletin, vol. 33, No. 6A, pp. 265–266, Nov. 1990.
IBM Technical Disclosure Bulletin, vol. 31, No. 9, pp. 351–354, Feb. 1989.
IBM Technical Disclosure Bulletin, vol. 33, No. 3A, pp. 441–442, Aug. 1990.
Micron Semiconductor, Inc., Spec Sheet, MT48LC2M8S1 S, cover page and pp. 33 and 37, 1993.

*Primary Examiner*—Frank J. Asta
*Attorney, Agent, or Firm*—Burns, Doane, Swecker & Mathis

[57] ABSTRACT

A controller for a synchronous DRAM is provided for maximizing throughput of memory requests to the synchronous DRAM. The controller maintains the spacing between the commands to conform with the specifications for the synchronous DRAMs while preventing gaps from occurring in the data slots to the synchronous DRAM. Furthermore, the controller allows memory requests and commands to be issued out of order so that the throughput may be maximized by overlapping required operations which do not specifically involve data transfer. To achieve this maximized throughput, memory requests are tagged for indicating a sending order. Thereafter, the memory requests may be arbitrated when conflicting memory requests are queued and this arbitration process is then decoded for simultaneously updating scheduling constraints. The memory requests may be further qualified based on the scheduling constraints and a command stack of memory request is then developed for modifying update queues. The controller also functions by receiving a controller clock signal and generating an SDRAM clock signal by dividing this controller clock signal.

20 Claims, 6 Drawing Sheets

CONTROLLER FOR A SYNCHRONOUS DRAM THAT MAXIMIZES THROUGHPUT BY ALLOWING MEMORY REQUESTS AND COMMANDS TO BE ISSUED OUT OF ORDER

BACKGROUND

The present invention is directed to a controller for maximizing throughput of memory requests from an external device to a synchronous DRAM. More particularly, the present invention is directed to a controller which prioritizes multiple memory requests from the external device and issues reordered memory requests to the synchronous DRAM so that the throughput from the external device to the synchronous DRAM is maximized.

Synchronous DRAMs are relatively new devices which are similar to conventional DRAMs but the synchronous DRAMs have some important differences. The architecture of the synchronous DRAMs is similar to conventional DRAMs. For instance, the synchronous DRAMs have multiplexed address pins, control pins such as RAS, CAS, CS, WE, and bidirectional data pins. Also, the synchronous DRAMs activate a page as does the conventional DRAM and then subsequent accesses to that page occur faster. Accordingly, a precharge operation must be performed before another page is activated.

One difference between synchronous DRAMs and conventional DRAMs is that all input signals are required to have a set-up and hold time with respect to the clock input in synchronous DRAMs. The hold time is referenced to the same clock input. The outputs also have a clock to output delay referenced to the same clock. Thereby, the synchronous characteristics are provided. Furthermore, the synchronous DRAMs are pipelined which means that the latency is generally greater than one clock cycle. As a result, second and third synchronous DRAM commands can be sent before the data from the original write request arrives at the synchronous DRAM. Also, the synchronous DRAMs have two internal banks of data paths which generally correspond to separate memory arrays sharing I/O pins. The two internal banks of memory paths are a JEDEC standard for synchronous DRAMs. An example of a known synchronous DRAM is a 2 MEG×8 SDRAM from Micron Semiconductor, Inc., model no. MT48LC2M8SS1S.

In the synchronous DRAMs, almost all I/O timings are referenced to the input clock. Minimum parameters such as CAS latency remain but are transformed from electrical timing requirements to logical requirements so that they are an integral number of clock cycles. The synchronous DRAMs for at least by-four and by-eight parts are a JEDEC standard with defined pin outs and logical functions. Because the synchronous DRAMs are internally pipelined, the pipe stage time is less than the minimum latency so that spare time slots can be used for other functions. For instance, the spare time slots can be used for bursting out more data (similar to a nibble mode) and issuing another "command" with limitations.

Certain problems arise when using synchronous DRAMs which must be addressed. For instance, the clock to output delay can equal the whole cycle. Also, because the synchronous DRAMs are pipelined, a second request must be given before the first one is complete to achieve full performance. Furthermore, the output electrical/load/timing specifications of synchronous DRAMs are difficult to meet. Therefore, a controller is desired for interfacing the synchronous DRAMs with devices which read and write, such as microprocessors, and meeting JEDEC standards for synchronous DRAMs so that versatile synchronous DRAMs may be provided and applied in many design applications.

SUMMARY

An object of the present invention is to control a synchronous DRAM by interfacing an external device, such as a microprocessor, for reading and writing to the synchronous DRAM.

Another object of the present invention is to provide a controller for a synchronous DRAM which can buffer and process multiple memory requests so that greater throughput, or an equivalent throughput at less latency, can be achieved by the synchronous DRAM.

A still further object of the present invention is to provide a controller for issuing and completing requests out of order with respect to the received or issued order so that the throughput of the synchronous DRAM is improved by overlapping required operations, which do not specifically involve data transfer, with operations involving data transfer.

A still further object of the present invention is to provide a controller for a synchronous DRAM that schedules memory request commands as closely together as possible within the timing constraints of the synchronous DRAM so that the throughput of the memory requests is maximized.

These objects of the present invention are fulfilled by providing a controller for a synchronous DRAM comprising a sorting unit for receiving memory requests and sorting said memory requests based on their addresses and a throughput maximizing unit for processing said memory requests to the synchronous DRAM in response to scheduling which maximizes the use of data slots by the synchronous DRAM. The controller is able to prioritize and issue multiple requests to the synchronous DRAM in a different order than was received or issued such that the out of order memory requests improve the throughput to the synchronous DRAM. In particular, the controller issues memory requests as closely together as possible while maintaining the timing constraints of the synchronous DRAM based on its specifications.

The objects of the present invention are also fulfilled by providing a method for controlling a synchronous DRAM comprising the steps of receiving memory requests and sorting said memory requests based on their addresses, and maximizing throughput of said memory requests to the synchronous DRAM so that use of data slots by the synchronous DRAM is maximized. Similarly, this method controls the memory requests issued to the synchronous DRAM so that they are spaced as closely as possible while maintaining the timing constraints of the synchronous DRAM based on its specifications.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DETAILED DESCRIPTION

Figure 1:
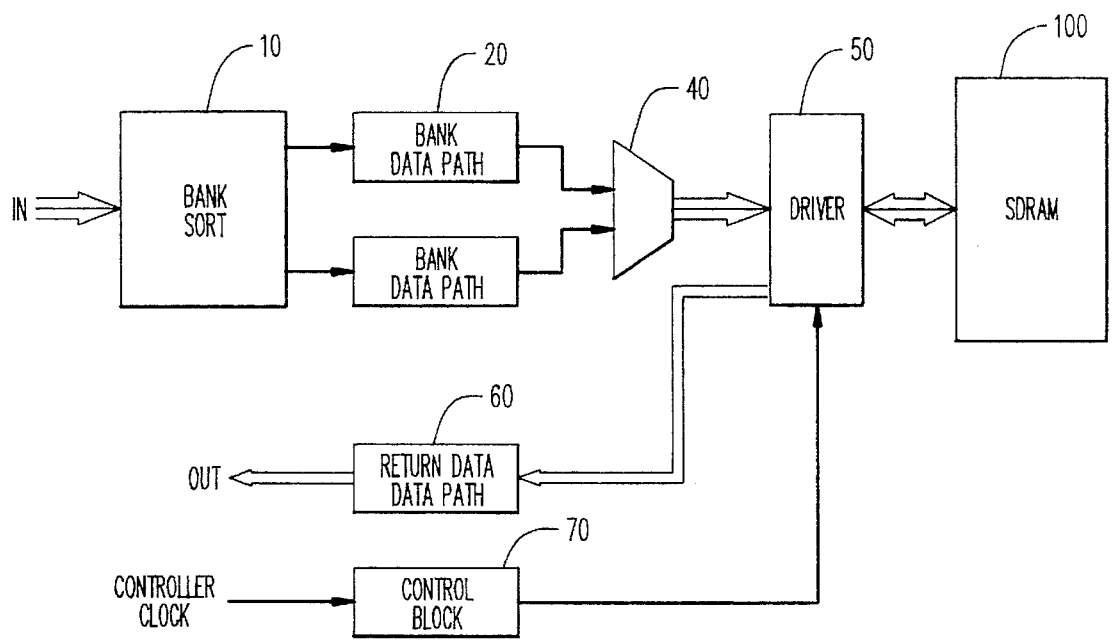
FIG. 1 illustrates a controller for a synchronous DRAM according to an embodiment of the present invention.

FIG. 1 illustrates a controller for a synchronous DRAM according to an embodiment of the present invention. In FIG. 1, signals corresponding to memory requests and commands from an external device, such as a microprocessor for example, are input to the controller at a bank sort unit 10. The bank sort unit 10 processes address, control, and data signals and sorts the data based on the address before sending the data to bank data paths 20 and 30. The output of the bank data paths 20 and 30 are multiplexed by a multiplexer 40 and input to a pad driver 50 before being input to the synchronous DRAM 100. The memory requests and commands are tagged to indicate their received order. The tags are used to indicate the order of the memory requests and commands for achieving increased throughput or re-ordering the memory requests and commands as will be further described. The tags may be associated with the memory requests and commands at the external device or may be generated by the bank sort unit 10. A return data path 60 receives data from the bank data paths 20 and 30 and the synchronous DRAM 100 via the pad driver 50 and is used to process and re-order the data, if necessary, based on the tag information.

The controller also includes a control block 70 which receives a controller clock. The control block 70 outputs a slower SDRAM clock which is based on the controller clock. More specifically, the SDRAM clock is derived in the control block 70 by dividing the controller clock with a programmable divisor between 4 and 32, inclusive, and applying wave shaping circuits having programmable offset and duty cycle inputs. The SDRAM clock is then input to the synchronous DRAM 100.

The controller may be implemented in BiCMOS technology which includes bipolar (ECL) style logic with CMOS pad drivers having integrated low swing differential to full swing (LVTTL) voltage level converters in a preferred embodiment. Because the logic is implemented in the bipolar (ECL) style circuits, very high speeds are possible with cycle times being in excess of 1 GHz. The controller is designed to run at a clock frequency greater than the SDRAM clock frequency. Both the SDRAM clock and sampling point for incoming data can be controlled to the accuracy of the controller clock so that a fully synchronous circuit can be maintained which has a sample point resolution greater than the SDRAM clock.

The programmable sample point overcomes the problem of the SDRAM clock to output delay being greater than or equal to one SDRAM clock period by providing a sampling point which can be placed at a particular controller clock edge. In the present controller, no analog delay elements are required or used. If analog delay elements were to be used in a different controller, which has a single clock frequency for the controller and the synchronous DRAM for example, the data generally would have to be resynchronized to the single clock after sampling. As a result, the data would be delayed by another entire SDRAM clock period before the data is available for use by the processor if analog delay elements are used. In addition, the return data path 60 runs at the same timing as the SDRAM clock but can be offset in time from the SDRAM clock edges by a programmable number of controller clock edges. The programmable clock and sampling points can also be used to provide adequate timing margins for different printed circuit board trace lengths or different loading conditions from various part configurations.

At the input from the external device, or within the controller, each memory request is "tagged" or assigned an integer to indicate the order in which the memory request was received as part of the control stream. This tag has three purposes. One purpose is for the tag to be passed with the loaded data back to the external device so that loads which are returned out of order will be indicated. A second purpose is that the tag may be used to send the earliest request to the synchronous DRAM when multiple pending requests may be serviced. A third purpose is that the tag may be used to service the earliest pending request only if the return of load data is required to be in order such as during system integration or debug. The controller functions to translate memory load and store requests into synchronous DRAM commands. For example, a simple load might be translated to the synchronous DRAM as the following sequence of commands: precharge, activate (for the high portion of addresses), and read (for the low portion of addresses). The controller also functions to enforce timing requirements and to queue a minimum of two requests. Furthermore, the controller functions to interrupt normal operation for required refresh, power on reset (load mode register), power down, and power up. The main purpose of the controller is to allow or provide greater throughput, or equivalent throughput at less latency, from the synchronous DRAMs.

This controller is applicable to computer systems where processors can request data much faster than the memory can provide the data (generally four to fifty times faster). Also, the controller is applicable to processors which do not stall for an individual memory request or processors which do not stop to wait for data where possible. The main goal of the controller is to achieve a high throughput of the memory requests and commands. Another important issue is latency, but minimizing latency is secondary to maximizing throughput in the present controller. Another goal of the controller is to provide flexibility in timing and configuration, but this is also secondary to maximizing throughput.

One feature of the controller is to buffer multiple memory requests, and in an example of the present embodiment, two memory requests can be buffered per bank. Buffering up to one request per bank allows for the opportunity of the banks being in parallel. By buffering two requests to the same bank, the same page address match computation and the actual memory data transfer may be placed in parallel. Another feature of the controller is to issue and complete requests out of order with respect to the order received or the order issued by the external device. Out of order issue/completion can improve throughput by overlapping required operations which do not specifically involve data transfer with operations involving data transfer.

The controller for state machines implemented in digital logic allows for out of order issue and completion by using dynamic constraint based, maximum throughput scheduling. In general, the memory requests are resolved into their required sequences of precharge/bank activate/read-write sequences and placed in a queue where one queue per bank exists. Dynamic constraint based logic determines which requests are ready to issue and scheduling logic chooses the requests thereafter, but not necessarily in the order that the requests are received. The requests are chosen according to the requests which can be issued to the synchronous DRAM without causing reduction in throughput. For example, bank 1 may be precharged while bank 0 is bursting out data. Also, the scheduling and logic select requests such that the throughput is maximized. For example, a read to a page and bank is chosen when directly following a read to that same page and bank.

The functions for each of the units described above do not have to be accomplished within four pulses of the controller clock, or a certain number of pulses of the controller clock. However, these steps must be completed within one SDRAM clock pulse. The SDRAM clock pulse relates to the controller clock and is determined by dividing the controller clock with the programmable divisor. A command stack of memory requests is developed for each bank of the data paths. The command update unit 210 updates the per bank command stack. An illustration of the update performed is provided in Table 1 below for a two-deep control stack.

TABLE 1

COMMAND UPDATE

| Incoming Request | | | | | | TOS | | Next | | | TOS | | Next | |
|---|---|---|---|---|---|---|---|---|---|---|---|---|---|---|
| go | rw | np | pop | pnp | st | tr | tnp | nr | nnp | st | tr | tnp | nr | nnp |
| incoming transactions, no pop's | | | | | | | | | | | | | | |
| 1 | X | X | 0 | 0 | 0 | X | X | X | X | 1 | rw | np | X | X |
| 1 | X | X | 0 | 0 | 1 | X | X | X | X | 2 | tr | tnp | rw | np |
| pop's | | | | | | | | | | | | | | |
| 0 | X | X | 1 | 0 | 1 | X | X | X | X | 0 | X | X | X | X |
| 0 | X | X | 1 | 0 | 2 | X | X | X | X | 1 | nr | nnp | X | X |
| 0 | X | X | 0 | 1 | 1 | X | X | X | X | 1 | tr | 0 | X | X |
| 0 | X | X | 0 | 1 | 2 | X | X | X | X | 2 | tr | 0 | nr | nnp |
| simultaneous incoming transactions and pops | | | | | | | | | | | | | | |
| 1 | X | X | 1 | 0 | 1 | X | X | X | X | 1 | rw | np | X | X |
| 1 | X | X | 0 | 1 | 1 | X | X | X | X | 2 | tr | 0 | rw | np |
| do nothing | | | | | | | | | | | | | | |
| 0 | X | X | 0 | 0 | 0 | X | X | X | X | 0 | X | X | X | X |
| 0 | X | X | 0 | 0 | 1 | X | X | X | X | 1 | tr | tnp | X | X |
| 0 | X | X | 0 | 0 | 2 | X | X | X | X | 2 | tr | tnp | nr | nnp |

Figure 2:
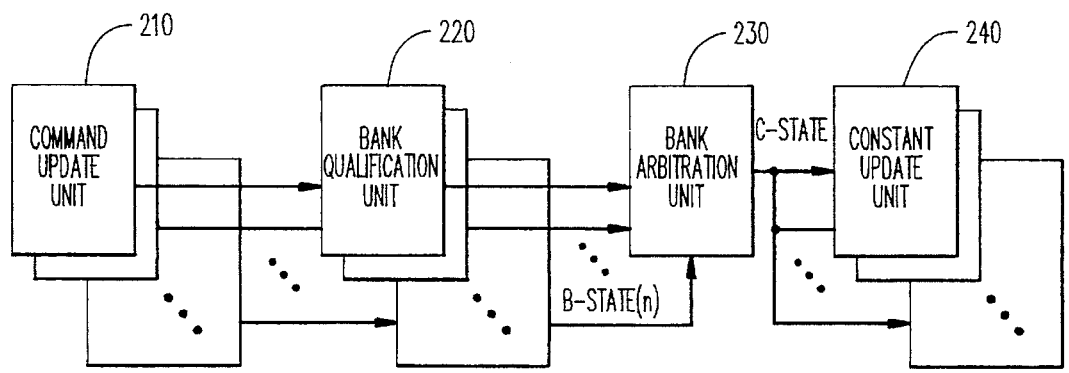
FIG. 2 illustrates a block diagram for prioritizing and issuing multiple requests to the synchronous DRAM by the controller illustrated for an embodiment of the present invention.

FIG. 2 further illustrates how multiple requests are prioritized and issued to the synchronous DRAMs. Each of the units illustrated in FIG. 2 are incorporated into the controller. For example, a command update unit 210, a bank qualification unit 220 and a constraint update unit 240 may be incorporated into each of the bank data paths 20 and 30 of FIG. 1 and a bank arbitration unit 230 may be incorporated into the control block 70. There is one bank arbitration unit 230 and a plurality (N) of other command update, bank qualification and constraint update units 210, 220 and 240 where N=the number of banks. The bank qualification unit 220 qualifies the per bank requests with the current synchronous DRAM status (active or precharged) and ongoing scheduling constraints. The bank qualification unit 220 further interprets memory requests and commands, such as load and store, into synchronous DRAM commands, such as activate, read, write and precharge. The bank arbitration unit 230 is connected to the bank qualification unit 220 and arbitrates between multiple sources of memory requests. The constraint update unit 240 is connected to the bank arbitration unit 230 for decoding the decision to synchronous DRAM standard commands while simultaneously updating scheduling constraints per each separate bank. The command update unit 210 is connected to the constraint update unit 240 for updating the per bank memory requests queues and popping the top element off to reveal the next request when necessary.

In Table 1, go represents the existence of a new command from the external device, rw represents a read or write request where rw=1 indicates a read request and rw=0 indicates a write request, np represents a new page where the transaction is a new page (row) address, pop represents an input transaction for popping the stack, pnp represents an input transaction for clearing the np bit if set (this allows a page activate to clear the np bit without popping the stack), and st represents the number of elements in the stack. Also, TOS indicates top of stack and next indicates the next entries in the stack.

In all of the tables, the inputs are on the left of the vertical bar and the outputs are to the right. An input of "X" means "don't care" and an output of "X" means unspecified. Outputs may assume symbolic values representing specific numeric values and may also assume the value of an input where the name of the input appears in the table.

The bank qualification unit 220 qualifies the top of the stack with constraints of the synchronous DRAM. The constraints on the synchronous DRAM may be obtained, for example, from the specification sheet of the device used, such as from the Micron Semiconductor Specification Sheet for MT48LC2M8S1S. The memory requests and commands are qualified per each bank of data path. Bank control inputs (st), read (tr) and new page (tnp), are combined with bank active signals and qualifiers (ok to read, write, activate, and precharge) to develop a per bank command request as illustrated in Table 2 below. The first three inputs of Table 2 correspond to the first three outputs in Table 1 from the command update unit 210. The control inputs indicate that there is a request pending (st>0), a read request is pending when the read qualifier is active and a new page address is requested when the new page qualifier is active.

TABLE 2

BANK QUALIFICATION

| TOS | | | | OK to Read Bank 0 | OK to Write Bank 0 | OK to Activate Bank 0 | OK to Prechg Bank 0 | Precharge if Idle | B State |
|---|---|---|---|---|---|---|---|---|---|
| st | tr | tnp | Active | | | | | | |
| *new page* | | | | | | | | | |
| >0 | X | 1 | 0 | X | X | 1 | X | X | BA1 |
| >0 | X | 1 | 0 | X | X | 0 | X | X | BI1 |
| >0 | X | 1 | 1 | X | X | X | 1 | X | BP1 |
| >0 | X | 1 | 1 | X | X | X | 0 | X | BI1 |
| *write* | | | | | | | | | |
| >0 | 0 | 0 | 0 | X | X | 1 | X | X | BA1 |
| >0 | 0 | 0 | 1 | X | 1 | X | X | X | BW1 |
| >0 | 0 | 0 | 0 | X | X | 0 | X | X | BI1 |
| >0 | 0 | 0 | 1 | X | 0 | X | X | X | BI1 |
| *read* | | | | | | | | | |
| >0 | 1 | 0 | 0 | X | X | 1 | X | X | BA1 |
| >0 | 1 | 0 | 1 | 1 | X | X | X | X | BR1 |
| >0 | 1 | 0 | 0 | X | X | 0 | X | X | BI1 |
| >0 | 1 | 0 | 1 | 0 | X | X | X | X | BI1 |
| *if no command, precharge if active, otherwise idle* | | | | | | | | | |
| 0 | X | X | 0 | X | X | X | X | X | BI1 |
| 0 | X | X | 1 | X | X | X | 1 | 1 | BP1 |
| 0 | X | X | 1 | X | X | X | 1 | 0 | BI1 |
| 0 | X | X | 1 | X | X | X | 0 | X | BI1 |

In Table 2, OK to Read Bank 0 is a constraint for reading from bank 0 which indicates that it is possible to read in this SDRAM cycle, Write Bank 0 is a constraint for writing to bank 0 which indicates that it is possible to write in this SDRAM cycle, OK to Activate Bank 0 is a constraint for activating bank 0 which indicates that it is possible to activate in this SDRAM cycle and Prechg Bank 0 is a constraint for precharging bank 0 which indicates that it is possible to precharge in this SDRAM cycle.

Next, the bank arbitration unit 230 arbitrates between commands from different banks so that the throughput is maximized. The arbitration is performed after the qualification so that the data slots between the commands are used as much as possible for memory requests. The arbitration is performed between banks and between system conditions such as power up, power down, and refresh. Table 3 below illustrates that one of the conflicting memory requests or commands is selected to maintain throughput based on previous reads or writes (with read always being picked over write) for preventing unused data slots. The first two inputs of Table 3 correspond to the outputs from the bank qualification unit 220 in Table 2. In addition, a least recently used bit (lrub) of the current bank is used as a "tie-breaker" for choosing a request.

TABLE 3

BANK ARBITRATION

| B State Bank 0 | B State Bank 1 | Supervisory State | Current Bank | Current Bank | C-State |
|---|---|---|---|---|---|
| BW1 | BR1 | SI | X | 1 | R1 |
| BA1 | BR1 | SI | X | 1 | R1 |
| BR1 | BW1 | SI | X | 0 | R1 |
| BR1 | BA1 | SI | X | 0 | R1 |
| BR1 | BP1 | SI | X | 0 | R1 |
| BA1 | BW1 | SI | X | 1 | W1 |
| BP1 | BW1 | SI | X | 1 | W1 |
| BW1 | BA1 | SI | X | 0 | W1 |
| BW1 | BP1 | SI | X | 0 | W1 |
| BP1 | BA1 | SI | X | 1 | A1 |
| BA1 | BP1 | SI | X | 0 | A1 |
| both banks want to do the same thing so preference is given to the least recently used bank | | | | | |
| BR1 | BR1 | SI | 0 | 1 | R1 |
| BR1 | BR1 | SI | 1 | 0 | R1 |
| BW1 | BW1 | SI | 0 | 1 | W1 |
| BW1 | BW1 | SI | 1 | 0 | W1 |
| BA1 | BA1 | SI | 0 | 1 | A1 |
| BA1 | BA1 | SI | 1 | 0 | A1 |
| BP1 | BP1 | SI | 0 | 1 | P1 |
| BP1 | BP1 | SI | 1 | 0 | P1 |
| arbitrate control state when one or more banks request idle | | | | | |
| BI1 | BI1 | SI | X | cb | I1 |
| BR1 | BI1 | SI | X | 1 | R1 |
| BW1 | BI1 | SI | X | 0 | W1 |

TABLE 3-continued

BANK ARBITRATION

| B State Bank 0 | B State Bank 1 | Supervisory State | Current Bank | Current Bank | C-State |
|---|---|---|---|---|---|
| BA1 | BI1 | SI | X | 0 | A1 |
| BP1 | BI1 | SI | X | 0 | P1 |
| BI1 | BR1 | SI | X | 1 | R1 |
| BI1 | BW1 | SI | X | 1 | W1 |
| BI1 | BA1 | SI | X | 1 | A1 |
| BI1 | BP1 | SI | X | 1 | P1 |
| reset sequence reqeusts, if active, have precedence | | | | | |
| X | X | SP | X | cb | P1 |
| X | X | SRF | X | cb | RF1 |
| X | X | SPD | X | cb | PD1 |
| X | X | SM | X | cb | M1 |
| X | X | SW | X | cb | I1 |
| X | X | SIL | X | cb | I1 |

In Table 3, B-State Bank 0 represents the bank state of bank 0 and B-state Bank 1 represents the bank state of bank 1. These two inputs along with the supervisory state have three bit wide field widths. The current bank select bit is at the input and the next bank select bit at the output and C-state represents the arbitrated control state.

The constraint update unit 240 is used to update constraints. Table 4 below illustrates how constraints are updated in each bank in response to the C-State output from the bank arbitration. The output counter indicates the number of SDRAM cycles one must wait before a read, write, activate or precharge operation can be performed.

TABLE 4

CONSTRAINT UPDATE

| BL (Burst Length) | tRCD (R/C Delay) | C State | Current Bank | Counter | OK to Read |
|---|---|---|---|---|---|
| X | 2 | A1 | 1 | trCD-1 | 0 |
| X | 3 | A1 | 1 | tRCD-1 | 0 |
| X | X | R1 | X | BL-1 | 0 |
| X | X | W1 | 1 | BL-1 | 0 |

| tAA (CAS Latency) | BL | tRCD | C-State | Current Bank | Counter | OK to Write |
|---|---|---|---|---|---|---|
| X | X | 2 | A1 | 1 | tRCD-1 | 0 |
| X | X | 3 | A1 | 1 | tRCD-1 | 0 |
| X | X | X | R1 | X | tAA + BL-1 | 0 |
| X | X | X | W1 | X | BL-1 | 0 |

| tRCm1 (Read Cycle Time) | tRRD (Row-Row Delay) | tRP (RAS Precharge) | C-State | Current Bank | Counter | OK to Activate |
|---|---|---|---|---|---|---|
| X | X | X | M1 | X | tRCm1 | 0 |
| X | X | X | RF1 | X | tRCm1 | 0 |
| X | X | 0 ... 1 | P1 | 1 | 0 | 1 |
| X | X | >1 | P1 | 1 | tRP-1 | 0 |
| X | 0 ... 1 | X | A1 | 0 | 0 | 1 |
| X | >1 | X | A1 | 0 | tRRD-1 | 0 |

| tAA | BL | tWR (Write Recovery Time) | C-State | Current Bank | Counter | OK to Precharge |
|---|---|---|---|---|---|---|
| 0 ... 1 | <4 | X | R1 | 1 | 0 | 1 |
| 0 ... 1 | 4 | X | R1 | 1 | tAA + 2 | 0 |
| >1 | X | X | R1 | 1 | tAA + BL-3 | 0 |
| X | X | X | W1 | 1 | tWR + BL-2 | 0 |

FIGS. 3(a)–3(h) illustrate some examples of part configurations supported by the controller. The part configurations of FIGS. 3(a), 3(c), 3(e) and 3(g) use 16 Mbit parts to support 4MBytes, 2MBytes, 8MBytes and 4MBytes of total memory respectively. The part configurations of FIGS. 3(b), 3(d), 3(f) and 3(h) use 64 Mbit parts to support 16 MBytes, 8 MBytes, 32 MBytes and 16 MBytes of total memory respectively. According to JEDEC specifications, the synchronous DRAM has two banks. As a result, the maximum number of banks is two times the number of parts used. With more banks, a more random stream of data can be handled faster. However, as the number of banks used increases, the hardware complexity increases due to the larger number of decisions which must be made at the same time.

Figure 3A:
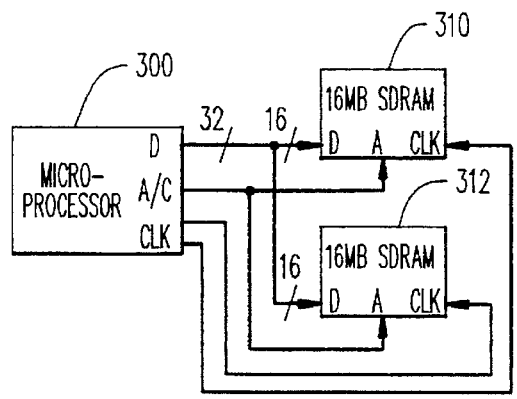
FIGS. 3(a)–3(h) illustrate part configurations of the synchronous DRAM for embodiments of the present invention.
Figure 3B:
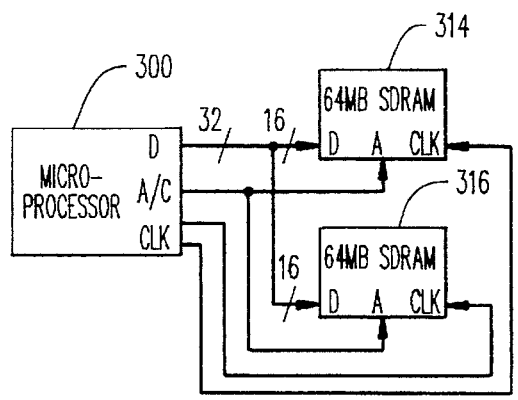
Figure 3C:
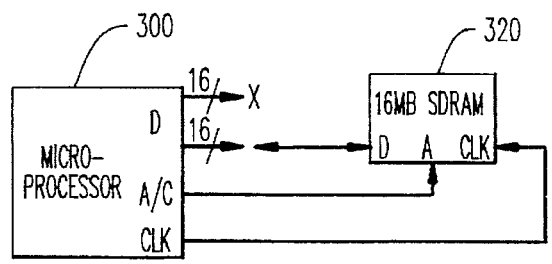
Figure 3D:
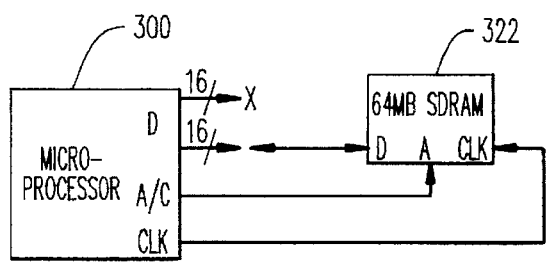
Figure 3E:
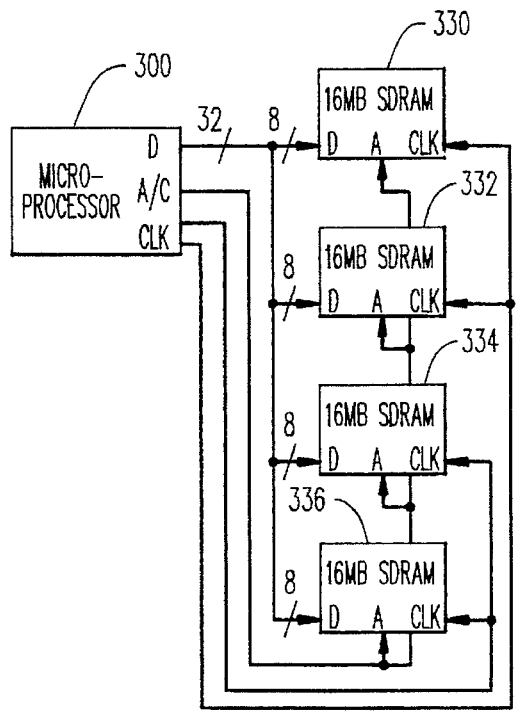
Figure 3F:
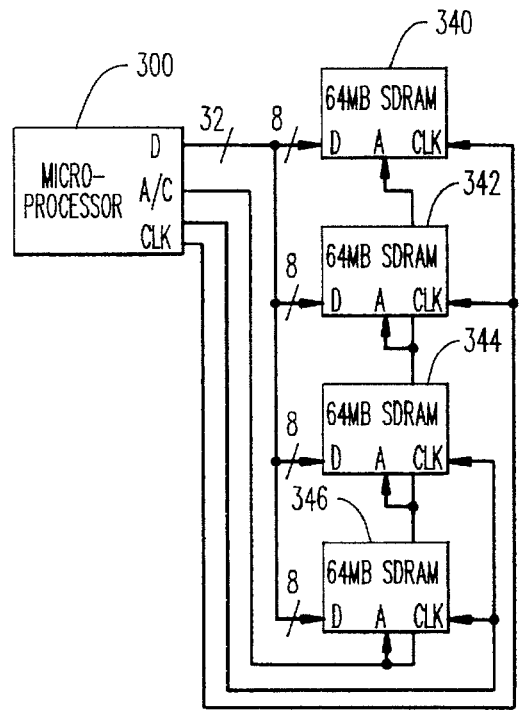
Figure 3G:
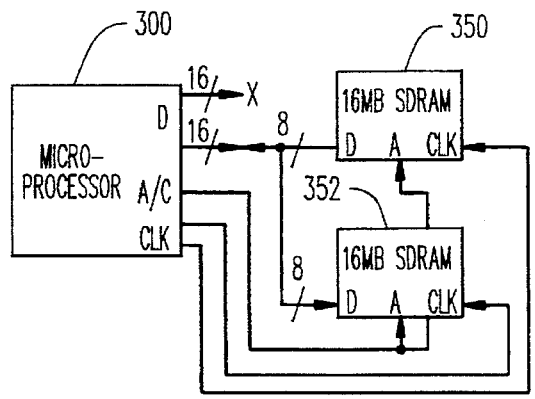
Figure 3H:
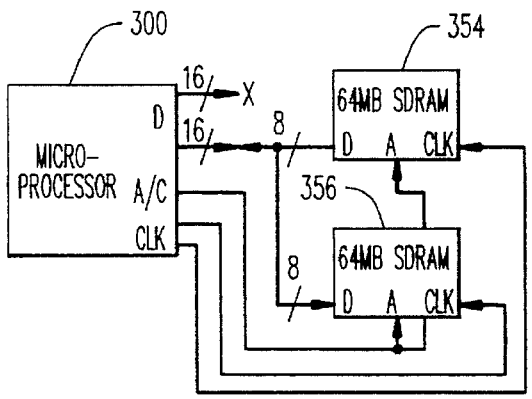

In FIGS. 3(a)–3(h), a microprocessor 300 is connected to synchronous DRAMs for the various configurations. The configurations of FIG. 3(a) and 3(b) support two 16 Mbit synchronous DRAMs 310 and 312 and two 64 Mbit synchronous DRAMs 314 and 316, respectively. The configurations of FIGS. 3(c) and 3(d) support one 16 Mbit synchronous DRAMs 320 and one 64 Mbit synchronous DRAMs 332, respectively. In FIGS. 3(e) and 3(f), configurations of four synchronous DRAMs 330, 332, 334 and 336 and four synchronous DRAMs 340, 342, 344 and 346 are respectively supported. FIGS. 3(g) and 3(h) support configurations of two synchronous DRAMs 350 and 352 and two synchronous DRAMs 354 and 356, respectively.

Figure 4A:
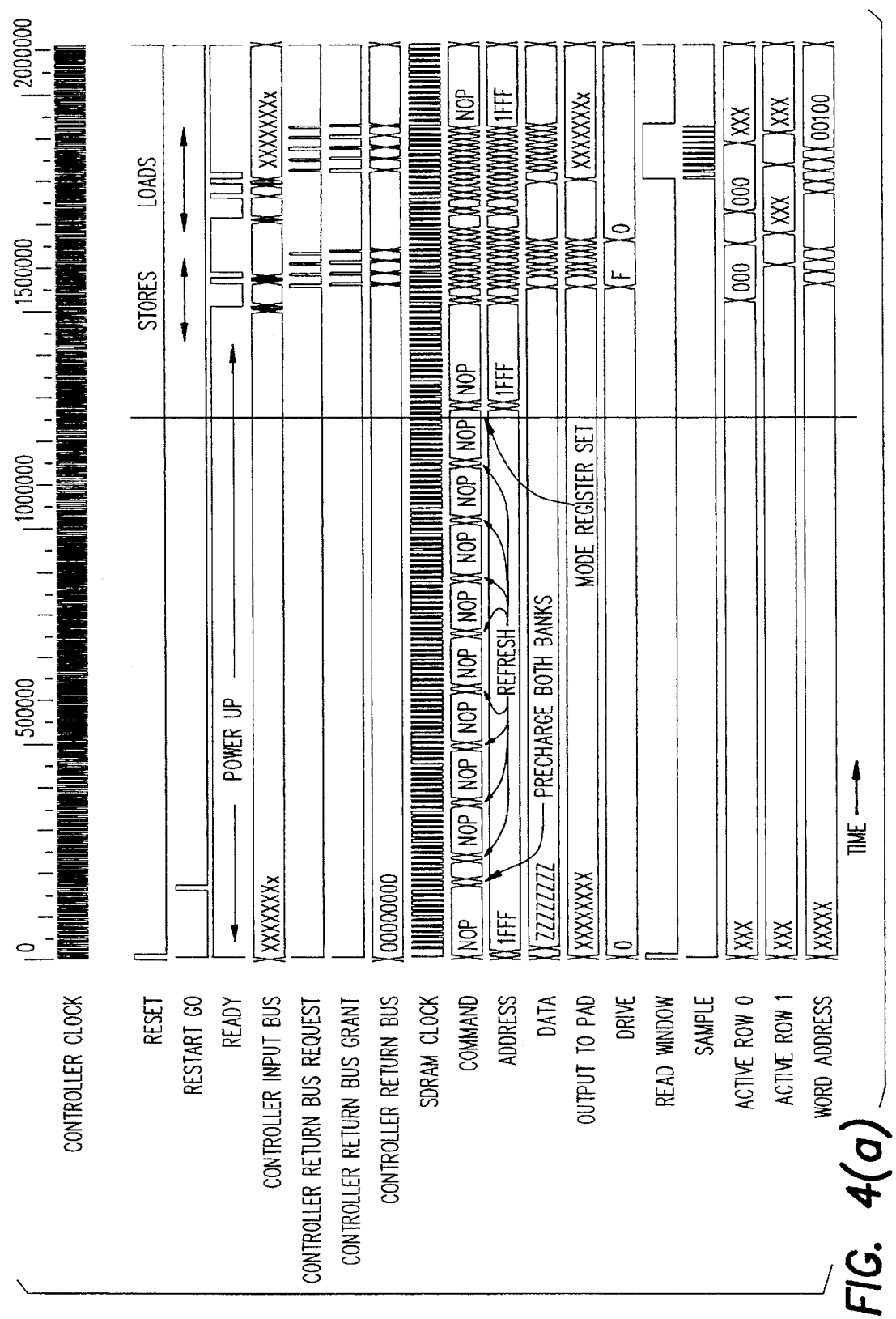
FIGS. 4(a)–4(c) illustrate timing diagrams for commands to the synchronous DRAM.

FIG. 4(a) illustrates the timing signals to the synchronous DRAM over a relatively large time frame. The controller clock (the fast clock) and the slower SDRAM clock are illustrated for the power up period and subsequent stores and loads in addition to signal at the SDRAM pins.

Figure 4B:
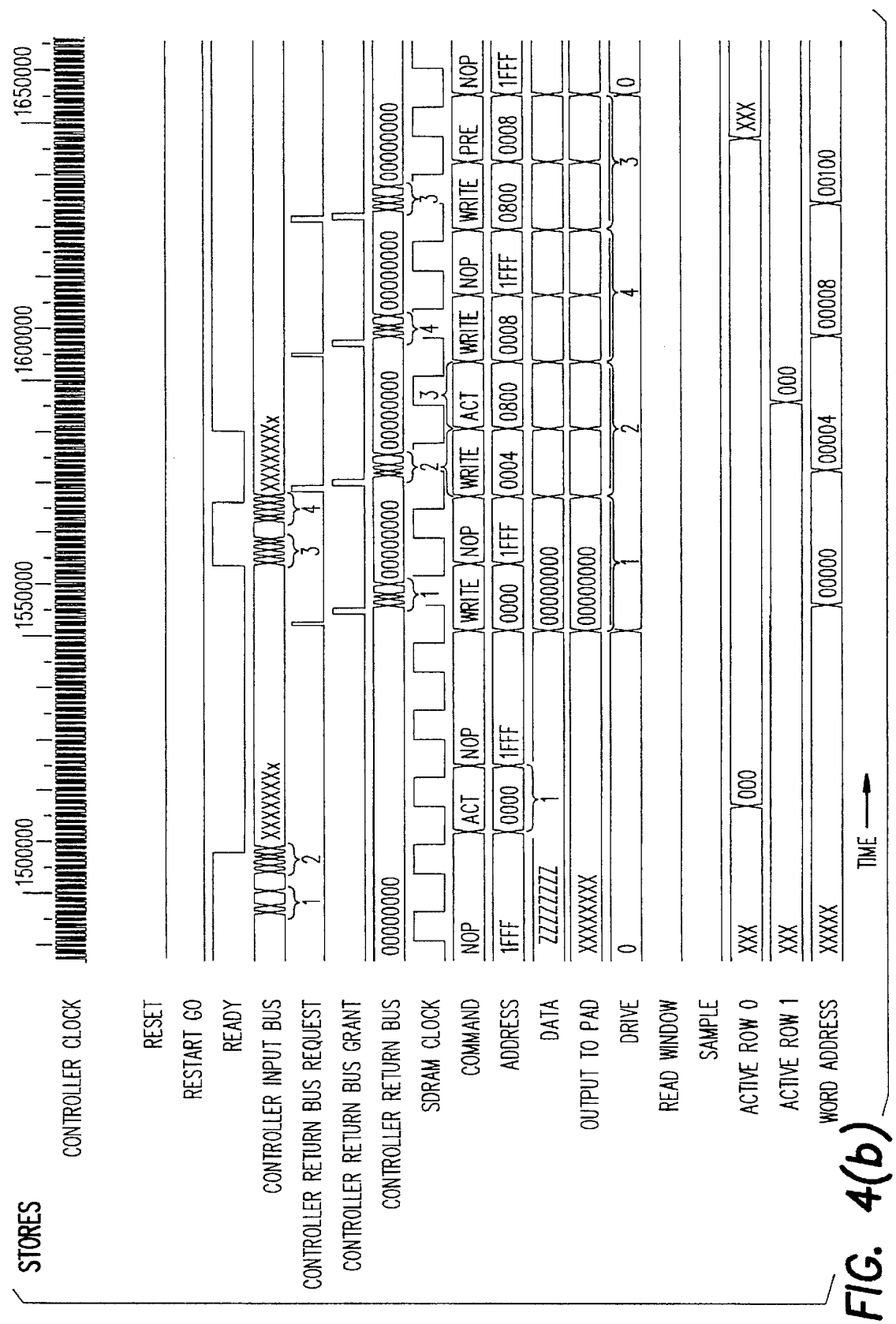

FIG. 4(b) illustrates an example of the reordering of a store request that occurs in the controller before being issued in the synchronous DRAM. As illustrated by the controller input bus, three writes are to be performed to bank 0 and one write is to be performed to bank 1. Also illustrated are the scheduled no operation periods (NOPs) which correspond to the timing constraints of the synchronous DRAM. For the first request on a controller input bus, bank 0 is activated and then written into. Next, a write operation is performed to bank 0 and no activation is necessary since bank 0 has already been activated. A write request follows to bank 1 and bank 1 must be activated as a result. Due to the timing constraints, bank 1 must wait to be written into. However, bank 0 still may be written into and since the request immediately following the write request to bank 1 is a write request to bank 0, the write request to bank 0 may be performed immediately after bank 1 is activated. Thereafter, the write to bank 1 may be performed after waiting the required amount of time after the activation to bank 1. Accordingly, the data slots are used as much as possible to maximize the throughput to the synchronous DRAM for the store operation.

Figure 4C:
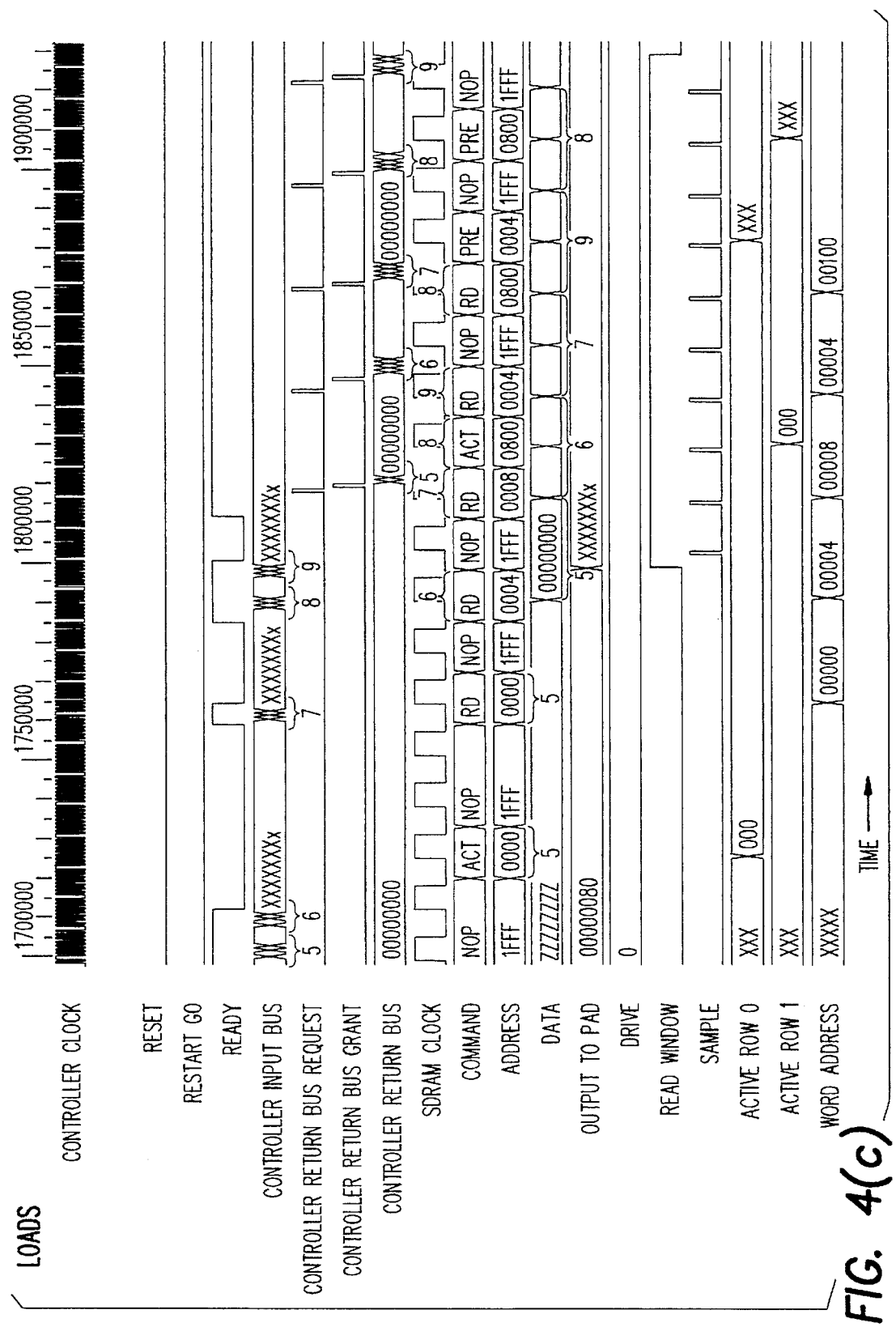

FIG. 4(c) similarly illustrates a timing diagram for loads. The first three requests are to bank 0 and after activating bank 0, the three read operations are successively performed. After the third load request to bank 0, a load request to bank 1 is requested. Therefore, bank 1 must be activated and the required amount of time must follow this activation. However, immediately after the load request to bank 1, a load request to bank 0 is requested. Accordingly, the load request to bank 0 may be immediately performed since the required time following the bank 1 activation must be met. After completing the read to bank 0 and waiting the sufficient amount of time for completing the activation, the read is performed to bank 1. Thereby, throughput of the memory requests to the synchronous DRAM is maximized. In contrast to stores, the return load data should be associated with the correct load request. Therefore, the tagging of the memory requests is important to ensure that returning load data is associated with the correct load request.

The invention being thus described, it would be obvious that the same may be varied in many ways. Such variations are not to be regarded as a departure from the spirit and scope of the invention and all such modifications that would be obvious to one skilled in the art are intended to be included within the scope of the following claims.

What is claimed is:

1. A controller for a synchronous DRAM comprising:
   a sorting unit for receiving memory requests and sorting said memory requests based on their addresses, wherein said memory requests are tagged for indicating a sending order thereof before said memory requests are sent to said sorting unit;
   a throughput maximizing unit for processing said memory requests to the synchronous DRAM in response to scheduling which maximizes the use of data slots by the synchronous DRAM.

2. A controller according to claim 1, wherein said sorting unit tags said requests for indicating a received order thereof.

3. A controller for a synchronous DRAM comprising:
   a sorting unit for receiving memory requests and sorting said memory requests based on their address;
   a throughput maximizing unit for processing said memory requests to the synchronous DRAM in response to scheduling which maximizes the use of data slots by the synchronous DRAM; and
   a control block for receiving a controller clock signal and developing an SDRAM clock signal by dividing said controller clock signal with a programmable divisor value.

4. A controller according to claim 3, wherein said predetermined divisor value is greater than or equal to 4 and less than or equal to 32.

5. A controller according to claim 3, wherein said throughput maximizing unit comprises a plurality of bank data paths for receiving said memory requests based on addresses sorted by said sorting unit at corresponding bank data paths.

6. A controller according to claim 5, wherein said control block further includes,
   an arbitration unit for arbitrating said memory requests based on the previous request to the synchronous DRAM, and when conflicting memory requests are queued in one of said bank data paths, and
   a constraint update unit for decoding the decisions from said arbitration unit and simultaneously updating scheduling constraints of the synchronous DRAM.

7. A controller according to claim 6, wherein said throughput maximizing unit further includes,
   a qualification unit for qualifying said memory requests based on scheduling constraints of the synchronous DRAM, and
   a command update unit for developing a command stack of said memory requests and modifying a plurality of update queues which each correspond to one of said bank data paths, in response to said qualification unit.

8. A controller according to claim 1, further comprising a return data path for detecting the order of data returning from the synchronous DRAM with respect to said sending order of the tagged memory request.

9. A controller according to claim 2, further comprising a return data path for detecting the order of data returning from the synchronous DRAM with respect to said received order of the tagged memory request.

10. A system for interfacing a processing device with a synchronous DRAM comprising:

means for developing memory requests from the processing device;

means for tagging said memory requests to indicate the order in which they are provided by the processing device; and a controller for maximizing throughput of said memory requests from the processing device to the synchronous DRAM based on scheduling constraints of the synchronous DRAM and arbitrating between conflicting memory requests so that data slots used by the synchronous DRAM are maximized.

11. A method for controlling a synchronous DRAM comprising the steps of:

(a) receiving memory requests and sorting said memory requests based on their addresses;

(b) tagging said memory requests to indicate a sending order thereof before said memory requests are received at said step (a); and (c) maximizing throughput of said memory requests to the synchronous DRAM so that use of data slots by the synchronous DRAM is maximized.

12. A method according to claim 11, further comprising the step of tagging said memory requests to indicate a received order thereof at said step (a).

13. A method for controlling a synchronous DRAM comprising the steps of:

(a) receiving memory requests and sorting said memory requests based on their addresses;

(b) maximizing throughput of said memory requests to the synchronous DRAM so that use of data slots by the synchronous DRAM is maximized; and (c) receiving a controller clock signal and developing an SDRAM clock signal by dividing said controller clock signal with a programmable divisor value.

14. A method according to claim 13, wherein said predetermined divisor value is greater than or equal to 4 and less than or equal to 32.

15. A method according to claim 13, wherein said step (b) receives said memory requests at a plurality of bank data paths corresponding to addresses sorted at said step (a).

16. A method according to claim 15, further comprising the steps of:

(c) arbitrating between said memory requests based on the previous request to the synchronous DRAM when conflicting memory requests are queued in one of said bank data paths; and (d) decoding the decisions at said step (c) and simultaneously updating scheduling constraints of the synchronous DRAM.

17. A method according to claim 16, further comprising the steps of:

(e) qualifying said memory requests based on scheduling constraints of the synchronous DRAM; and (f) developing a command stack of said memory requests in a plurality of update queues, where each of said update queues corresponds to one of said bank data paths, and modifying said update queues in response to qualifying at said step (e).

18. A method according to claim 11, further comprising the step of detecting the order of data returning from the synchronous DRAM on a return data path with respect to said sending order of the tagged memory requests.

19. A method according to claim 12, further comprising the step of detecting the order of data returning from the synchronous DRAM on a return data path with respect to said received order of the tagged memory request.

20. A method for interfacing a processing device with a synchronous DRAM, comprising the steps of:

(a) developing memory requests from the processing device;

(b) tagging said memory requests to indicate the order in which they are provided by the processing device; and (c) maximizing throughput of said memory requests from the processing device to the synchronous DRAM based on scheduling constraints of the synchronous DRAM and arbitrating between conflicting memory requests so that the data slots used by the synchronous DRAM are maximized.

* * * * *

(12) EX PARTE REEXAMINATION CERTIFICATE (6429th)
United States Patent
Zuravleff et al.

(10) Number: US 5,630,096 C1
(45) Certificate Issued: Sep. 16, 2008

(54) CONTROLLER FOR A SYNCHRONOUS DRAM THAT MAXIMIZES THROUGHPUT BY ALLOWING MEMORY REQUESTS AND COMMANDS TO BE ISSUED OUT OF ORDER

(75) Inventors: William K. Zuravleff, Mountainview, CA (US); Timothy Robinson, Boulder Creek, CA (US)

(73) Assignee: Microunity Systems Engineering, Inc., Sunnyvale, CA (US)

Reexamination Request:
No. 90/007,611, Jun. 30, 2005

Reexamination Certificate for:
Patent No.: 5,630,096
Issued: May 13, 1997
Appl. No.: 08/437,975
Filed: May 10, 1995

(51) Int. Cl.
  *G06F 13/16* (2006.01)
  *G06F 13/20* (2006.01)
  *G06F 13/28* (2006.01)

(52) U.S. Cl. ............... 711/154; 711/105; 711/150; 711/151; 711/158; 711/167; 711/169

(58) Field of Classification Search ............ 711/105, 711/150, 151, 154, 158, 167, 169; 365/233
See application file for complete search history.

(56) References Cited

U.S. PATENT DOCUMENTS

| | | |
|---|---|---|
| 3,814,924 A | 6/1974 | Tate |
| 3,916,388 A | 10/1975 | Shimp |
| 4,509,119 A | 4/1985 | Gumaer |
| 4,527,232 A | 7/1985 | Bechtolsheim |
| 4,583,199 A | 4/1986 | Boothroyd |
| 4,685,076 A | 8/1987 | Yoshida |
| 4,796,232 A | 1/1989 | House |
| 4,803,621 A | 2/1989 | Kelly |
| 4,814,976 A | 3/1989 | Hansen |
| 4,825,361 A | 4/1989 | Omoda |
| 4,825,401 A | 4/1989 | Ikumi |
| 4,833,599 A | 5/1989 | Colwell |
| 4,843,543 A | 6/1989 | Isobe |
| 4,852,098 A | 7/1989 | Brechard |
| 4,875,161 A | 10/1989 | Lahti |
| 4,884,190 A | 11/1989 | Ngai |
| 4,888,679 A | 12/1989 | Fossum |

(Continued)

FOREIGN PATENT DOCUMENTS

| EP | 0427425 A2 | 5/1991 |
|---|---|---|
| EP | 0468820 A2 | 1/1992 |
| JP | S60-217435 | 10/1985 |

(Continued)

OTHER PUBLICATIONS

U.S. Appl. No. 08/340,740, filed Nov. 16, 1994, Wulf.
Asprey et al., "Performance Features of the PA7100 Microprocessor," IEEE Micro, 22–35 (Jun. 1993).

(Continued)

*Primary Examiner*—Woo H. Choi

(57) ABSTRACT

A controller for a synchronous DRAM is provided for maximizing throughput of memory requests to the synchronous DRAM. The controller maintains the spacing between the commands to conform with the specifications for the synchronous DRAMs while preventing gaps from occurring in the data slots to the synchronous DRAM. Furthermore, the controller allows memory requests and commands to be issued out of order so that the throughput may be maximized by overlapping required operations which do not specifically involve data transfer. To achieve this maximized throughput, memory requests are tagged for indicating a sending order. Thereafter, the memory requests may be arbitrated when conflicting memory requests are queued and this arbitration process is then decoded for simultaneously updating scheduling constraints. The memory requests may be further qualified based on the scheduling constraints and a command stack of memory request is then developed for modifying update queues. The controller also functions by receiving a controller clock signal and generating an SDRAM clock signal by dividing this controller clock signal.

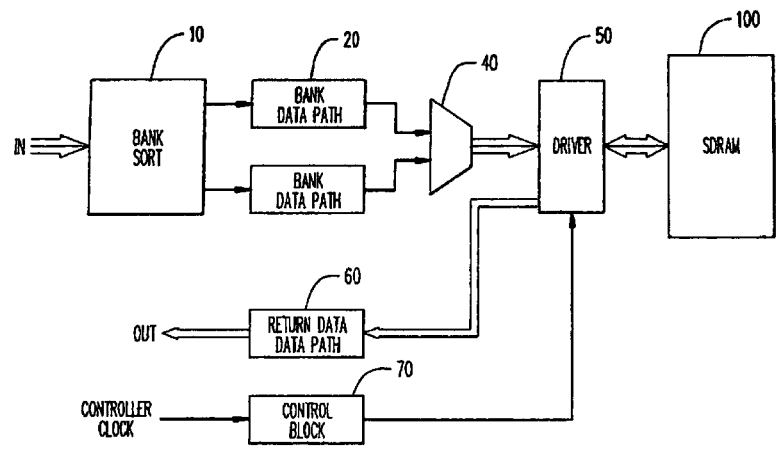

U.S. PATENT DOCUMENTS

| Patent | Date | Name |
|---|---|---|
| 4,888,682 A | 12/1989 | Ngai |
| 4,899,272 A | 2/1990 | Fung |
| 4,910,667 A | 3/1990 | Tanaka |
| 4,920,477 A | 4/1990 | Colwell |
| 4,924,375 A | 5/1990 | Fung |
| 4,937,791 A | 6/1990 | Steele |
| 4,943,919 A | 7/1990 | Aslin |
| 4,949,250 A | 8/1990 | Bhandarkar |
| 4,949,294 A | 8/1990 | Wambergue |
| 4,953,073 A | 8/1990 | Moussouris |
| 4,953,119 A | 8/1990 | Wong |
| 4,959,779 A | 9/1990 | Weber |
| 4,980,817 A | 12/1990 | Fossum |
| 5,008,812 A | 4/1991 | Bhandarkar |
| 5,034,917 A | 7/1991 | Bland |
| 5,040,153 A | 8/1991 | Fung |
| 5,043,867 A | 8/1991 | Bhandarkar |
| 5,051,889 A | 9/1991 | Fung |
| 5,081,698 A | 1/1992 | Kohn |
| 5,113,506 A | 5/1992 | Moussouris |
| 5,113,521 A | 5/1992 | McKeen |
| 5,155,816 A | 10/1992 | Kohn |
| 5,157,388 A | 10/1992 | Kohn |
| 5,161,247 A | 11/1992 | Murakami |
| 5,168,547 A | 12/1992 | Miller |
| 5,168,573 A | 12/1992 | Fossum |
| 5,179,651 A | 1/1993 | Taaffe |
| 5,179,667 A | 1/1993 | Iyer |
| 5,187,796 A | 2/1993 | Wang |
| 5,197,130 A | 3/1993 | Chen |
| 5,201,043 A | 4/1993 | Crawford |
| 5,208,914 A | 5/1993 | Wilson |
| 5,212,777 A | 5/1993 | Gove |
| 5,231,646 A | 7/1993 | Heath |
| 5,233,690 A | 8/1993 | Sherlock |
| 5,241,636 A | 8/1993 | Kohn |
| 5,245,564 A | 9/1993 | Quek |
| 5,253,342 A | 10/1993 | Blount |
| 5,256,994 A | 10/1993 | Langendorf |
| 5,260,889 A | 11/1993 | Palaniswami |
| 5,265,213 A | 11/1993 | Weiser |
| 5,268,995 A | 12/1993 | Diefendorff |
| 5,278,974 A | 1/1994 | Lemmon |
| 5,287,327 A | 2/1994 | Takasugi |
| 5,301,278 A | 4/1994 | Bowater |
| 5,303,364 A | 4/1994 | Mayer |
| 5,323,489 A * | 6/1994 | Bird .......................... 711/167 |
| 5,327,369 A | 7/1994 | Ashkenazi |
| 5,327,570 A | 7/1994 | Foster |
| 5,339,276 A | 8/1994 | Takasugi |
| 5,347,481 A | 9/1994 | Williams |
| 5,357,606 A | 10/1994 | Adams |
| 5,361,370 A | 11/1994 | Sprague |
| 5,367,705 A | 11/1994 | Sites |
| 5,371,772 A | 12/1994 | Al-Khairi |
| 5,375,208 A | 12/1994 | Pitot |
| 5,390,135 A | 2/1995 | Lee |
| 5,410,669 A | 4/1995 | Biggs |
| 5,410,682 A | 4/1995 | Sites |
| 5,416,743 A | 5/1995 | Allan |
| 5,424,967 A | 6/1995 | Lee |
| 5,426,600 A | 6/1995 | Nakagawa |
| 5,430,676 A | 7/1995 | Ware |
| 5,430,688 A | 7/1995 | Takasugi |
| 5,434,817 A | 7/1995 | Ware |
| 5,440,713 A | 8/1995 | Lin |
| 5,442,799 A | 8/1995 | Murakami |
| 5,446,696 A | 8/1995 | Ware |
| 5,448,509 A | 9/1995 | Lee |
| 5,450,130 A | 9/1995 | Foley |
| 5,467,131 A | 11/1995 | Bhaskaran |
| 5,471,628 A | 11/1995 | Phillips |
| 5,477,181 A | 12/1995 | Li |
| 5,477,543 A | 12/1995 | Purcell |
| 5,499,385 A | 3/1996 | Farmwald |
| 5,511,024 A | 4/1996 | Ware |
| 5,513,327 A | 4/1996 | Farmwald |
| 5,513,366 A | 4/1996 | Agarwal |
| 5,515,520 A | 5/1996 | Hatta |
| 5,521,856 A | 5/1996 | Shiraishi |
| 5,521,879 A | 5/1996 | Takasugi |
| 5,522,054 A | 5/1996 | Gunlock |
| 5,530,960 A | 6/1996 | Parks |
| 5,533,185 A | 7/1996 | Lentz |
| 5,537,606 A | 7/1996 | Byrne |
| 5,541,865 A | 7/1996 | Ashkenazi |
| 5,577,236 A | 11/1996 | Johnson |
| 5,586,070 A | 12/1996 | Purcell |
| 5,590,350 A | 12/1996 | Guttag |
| 5,590,365 A | 12/1996 | Ide |
| 5,602,994 A | 2/1997 | Ferron |
| 5,615,355 A | 3/1997 | Wagner |
| 5,636,351 A | 6/1997 | Lee |
| 5,638,534 A | 6/1997 | Mote |
| 5,640,528 A | 6/1997 | Harney |
| 5,649,142 A | 7/1997 | Lavelle |
| 5,654,769 A | 8/1997 | Ohara |
| 5,659,782 A | 8/1997 | Senter |
| 5,666,298 A | 9/1997 | Peleg |
| 5,666,494 A | 9/1997 | Mote |
| 5,673,321 A | 9/1997 | Lee |
| 5,680,338 A | 10/1997 | Agarwal |
| 5,701,434 A | 12/1997 | Nakagawa |
| 5,713,011 A * | 1/1998 | Satoh et al. ................ 713/501 |
| 5,717,639 A | 2/1998 | Williams |
| 5,732,236 A | 3/1998 | Nguyen |
| 5,734,874 A | 3/1998 | Van Hook |
| 5,793,661 A | 8/1998 | Dulong |
| 5,801,975 A | 9/1998 | Thayer |
| 5,805,912 A | 9/1998 | Johnson |
| 5,812,829 A | 9/1998 | Ito |
| 5,819,101 A | 10/1998 | Peleg |
| 5,825,677 A | 10/1998 | Agarwal |
| 5,826,106 A | 10/1998 | Pang |
| 5,828,869 A | 10/1998 | Johnson |
| 5,872,965 A | 2/1999 | Petrick |
| 5,881,275 A | 3/1999 | Peleg |
| 5,883,824 A | 3/1999 | Lee |
| 5,887,162 A | 3/1999 | Williams |
| 5,887,182 A | 3/1999 | Kinoshita |
| 5,887,183 A | 3/1999 | Agarwal |
| 5,893,145 A | 4/1999 | Thayer |
| 5,896,551 A | 4/1999 | Williams |
| 5,909,572 A | 6/1999 | Thayer |
| 5,996,057 A | 11/1999 | Scales, III |
| 6,008,850 A | 12/1999 | Sumihiro |
| 6,009,505 A | 12/1999 | Thayer |
| 6,016,538 A | 1/2000 | Guttag |
| 6,058,465 A | 5/2000 | Nguyen |
| 6,154,826 A | 11/2000 | Wulf |
| 6,173,366 B1 | 1/2001 | Thayer |
| 6,175,901 B1 | 1/2001 | Williams |
| 6,381,690 B1 | 4/2002 | Lee |
| 6,516,406 B1 | 2/2003 | Peleg |
| 6,807,609 B1 | 10/2004 | Lemmon |

FOREIGN PATENT DOCUMENTS

| | | |
|---|---|---|
| JP | 3268024 | 11/1991 |
| JP | 06189292 A | 7/1994 |
| JP | 8111090 A2 | 5/1996 |
| JP | 8115069 A2 | 5/1996 |

| | | |
|---|---|---|
| WO | WO 91/16680 | 10/1991 |
| WO | WO 93/01565 | 1/1993 |
| WO | WO 93/11500 | 6/1993 |
| WO | WO 97/07450 | 2/1997 |

OTHER PUBLICATIONS

Beckerle, "Overview of the START (*T) Multithreaded Computer," IEEE COMPON, 148–56 (Feb. 22–26, 1993).

BSP and BSP Customer Attributes, Inclosure 5, Burroughs Corporation (Aug. 1, 1977).

BSP Floating Point Arithmetic, Burroughs Corporation, (Dec. 1978).

BSP Implementation of Fortran, Burroughs Corporation, (Feb. 1978).

BSP, Burroughs Scientific Process, Burroughs Corporation, 1–29 (Jun. 1977).

Bursky, "Synchronous DRAMs Clock At 100 MHz," Electronic Design, vol. 41, No. 4, 45–49 (Feb. 18, 1993).

Diefendorff et al., "Organization of the Motorola 88110 Superscalar RISC Microprocessor," IEEE Micro, 40–63 (Apr. 1992).

D. D. Gajski and L. P. Rubinfeld, "Design of Arithmetic Elements for Burroughs Scientific Processor," Proceedings of the 4th Symposium on Computer Arithmetic, Santa Monica, CA, 245–56 (1978).

"System Architecture." ELXSI (2d Ed. Oct. 1983).

"System Foundation Guide," ELXSI ($1^{st}$ Ed. Oct. 1987).

Grimes et al., The Intel i860 64–Bit Processor: A General–Purpose CPU with 3D Graphics Capabilities, IEEE Computer Graphcis & Applications, 85–94 (Jul. 1989).

Guttag et al., "A Single–Chip Multiprocessor For Multimedia: The MVP," IEEE Computer Graphics & Applications, 53–64 (Nov. 1992).

Gwennap, "New PA–RISC Processor Decodes MPEG Video: HP's PA–7100LC Uses New Instructions to Eliminate DecoderChip," Microprocessor Report, 16–17 (Jan. 24, 1994).

L. Higbie, "Applications of Vector Processing," Computer Design, 139–45 (Apr. 1978).

K. Hwang & F. Briggs, "Computer Architecture and Parallel Processing," McGraw Hill Book Co., Singapore (1988).

Ide et al., "A 320–MFLOPS CMOS Floating–Point Processing Unit for Superscalar Processors," IEEE Journal of Solid–State Circuits, vol. 28, No. 3, 352–61 (Mar. 1993).

"IEEE Standard for Communicating Among Processors and Peripherals Using Shared Memory (Direct Memory Access—DMA)," IEEE (1994).

Kohn et al., "Introducing the Intel i860 64–Bit Microprocessor," IEEE Micro, 15–30 (Aug. 1989).

D.A. Kuck & R. Stokes, "The Burroughs Scientific Processor (BSP)," IEEE Transactions on Computers, vol. C–31, No. 5, 363–76 (May 1982).

Kurpanek et al., "PA7200: A PA–RISC Processor with Integrated High Performance MP Bus Interface," IEEE COMPCON '94, 375–82 (Feb. 28–Mar. 4, 1994).

Lee, "Accelerating Multimedia with Enhanced Microprocessors," IEEE Micro, vol. 15, No. 2, 22–32 (Apr. 1995).

Lion Extension Architecture (Oct. 12, 1991).

Margulis, "i860 Microprocessor Architecture," Intel Corporation (1990).

"MC88110 Second Generation RISC Microprocessor User's Manual," Motorola (1991).

N15 External Architecture Specification (Dec. 14, 1990).

N15 Micro Architecture Specification (Apr. 29, 1991).

"Paragon User's Guide," Intel Corporation (Oct. 1993).

PA–RISC 1.1 Architecture and Instruction Set Reference Manual, Third Edition, Hewlett–Packard (Feb. 1994).

Spaderna et al., "An Integrated Floating Point Vector Processor for DSP and Scientific Computing," IEEE International Conference on Computer Design: VLSI in Computers and Processors, 8–13 (Oct. 1989).

Sprunt et al., "Priority–Driven, Preemptive I/O Controllers for Real–Time Systems," IEEE (1988).

"TMS320C80 (MVP) Parallel Processor User's Guide," Texas Instruments (Mar. 1995).

Turcotte, "A Survey of Software Environments for Exploiting Networked Computing Resources," Engineering Research Center for Computational Field Simulation (Jun. 11, 1993).

Undy et al., "A Low–Cost Graphics and Multimedia Workstation Chip Set," IEEE Micro, 10–22 (Apr. 1994).

Watkins et al., "A Memory Controller with an Integrated Graphics Processor," IEEE, 324–36 (1993).

The 82C302 Page/Interleave Memory Controller.

*AT386 CHIPSet Functional Specification,* Chips and Technologies, Inc. (May 8, 1986).

*82C302 Page/Interleave Memory Controller Data Sheet,* Chips and Technologies, Inc. (1987).

J.E. Thornton, Design of a Computer: The Control Data 6600 (1970).

*CS4031 CHIPSet Advance Product Information* (May 10, 1993).

*MPC105 PCI Bridge/Memory Controller Technical Summary,* Motorola, Inc. (Jan. 1995).

Karl Wang et al, "Designing the MPC105 PCI Bridge/Memory Controller," *IEEE Micro* 44–49 (Apr. 1995).

Michael J. Garcia & Brian K. Reynolds, "Single Chip PCI Bridge and Memory Controller for PowerPC™ Microprocessors," *IEEE International Conference on Computer Design: VLSI in Computers and Processors* 409–12 (Oct. 1994).

Micron MT48LC2M8S1 (S) 2 MEG ×8 SDRAM Advance Data Sheet (Apr. 1994).

D.J. Lang et al, "Enhanced Refresh Mechanism for Higher Performance in Memory Subsystems," *IBM Technical Disclosure Bulletin* vol. 37, No. 10 (Oct. 1994).

R.E. Busch et al., "Dynamic Random Accesss Memory Data Burst Control," *IBM Technical Disclosure Bulletin* vol. 37, No. 9 (Sep. 1994).

M.J. Carnevale et al., "Fast Data Access of DRAMs by Utilizing and Queued Memory Command Buffer," *IBM Technical Disclosure Bulletin* vol. 35, No. 7 (Dec. 1992).

Configurations for Solid States Memories, JEDEC Standard No. 21–C, release 4 (Nov. 1993).

Robert Adams and Gregory Scavone, "Design a DRAM controller from the top down," *Electronic Design News,* pp. 183–188 (Apr. 27, 1989).

Dave Bursky, Synchrounous DRAMs Clock at 100MHz, *Electronic Design* 45, 48 (Feb. 18, 1993).

Betty Prince et al., "Synchronous dynamic RAM," *IEEE Spectrum* 44–46 (Oct. 1992).

Sean w. McGee et al., "Design of a Processor Bus Interface ASIC for the Stream Memory Controller," *Proceedings of the IEEE International SIC Conference,* Rochester, NY (Sep. 1994).

T. C. Landon et al., "An Approach for Optimizing Synthesized High–Speed ASICs," *Proc. IEEE Int'l ASIC Conference,* Austin, TX (Sep. 1995).

Sally A. McKee, "Hardware Support for Dynamic Access Ordering: Performance of Some Design Options," Computer Science Report No. CS–93–08 (Aug. 9, 1993).

S. A. McKee et al., "Experimental Implementation of Dynamic Access Ordering," *Proceedings of the Twenty–Seventh Hawaii International Conference* (Jan. 1994), Computer Science Report No. CS–93–42 (Aug. 1, 1993).

Sally A. McKee, "Maximizing Memory Bandwidth for Streamed Computations," Ph.D. dissertation (May 1995).

The AMD–K6 3D Processor: Revolutionary Multimedia Performance, Abacus (1998).

"AMD to Co–Sponsor Microsoft Professional Developers Conference," http://www.amd.com/usen/ Corporate/VirtualPressRoom/0,,51_51_104_543_555~953,00.html (Oct. 12, 1997).

Alvarez et al, "A 450MHz PowerPC Microprocessor with Enhanced Instruction Set and Copper Interconnect," ISSCC (Feb. 1999).

"AltiVec™ Technology Programming Environments Manual" (1998).

Tyler et al., "AltiVec™ : Bringing Vector Technology to the PowerPC™ Processor Family," IEEE (Feb. 1999).

BSP and BSP Customer Attributes, Inclosure 5, 1–5, Burroughs Corporation (Aug. 1, 1977).

BSP Floating Point Arithmetic, Burroughs Corporation, 1–27 (Dec. 1978).

BSP, Burroughs Scientific Processor, Burroughs Corporation, 1–29 (Jun. 1977).

Foley, "The Mpact™ Media Processor Redefines the Multimedia PC," IEEE, Proceedings of COMPON (Spring 1996).

Epstein, "Chromatic Raises the Multimedia Bar," Microprocessor Report (Oct. 23, 1995).

Mpact Media Processor: Preliminary Data Sheet, Chromatic Research, Inc. (Sep. 11, 1996).

Kalapathy, "Hardware–Software Interactions on Mpact," IEEE Micro (1997).

"The Vector Coprocessor Unit (VU) for the CM–5," Hot Chip IV Symposium (Aug. 11, 1992).

"Connection Machine CM–5 Technical Summary," Thinking Machines Corp. (Nov. 1993).

"CMMD User's Guide: Version 3," Thinking Machines Corp. (May 1993).

"CMMD Reference Manual: Version 3," Thinking Machines Corp. (May 1993).

Michielse, "Programming the Convex Exemplar Series SPP System," Proceedings of Parallel Scientific Computing, First Intl Workshop, PARA '94, pp. 375–382 (Jun. 20–23, 1994).

Wadleigh et al., "High Performance FFT Algorithms for the Convex C4/XA Supercomputer," Poster, Conference on Supercomputing, Washington, D.C. (Nov. 1994).

Wadleigh et al., "High–Performance FFT Algorithms for the Convex C4/XA Supercomputer," Journal of Super Computing, vol. 9, pp. 163–178 (1995).

Saturn Architecture Specification (Apr. 29, 1993).

Saturn Overview (Nov. 11, 1993 & Feb. 4, 1994).

Saturn Assembly Level Performance Tuning Guide (Jan. 1, 1994).

Saturn Differences from C Series, 1–8, (Feb. 6, 1994).

"GaAs Supercomputer Vendors Hit Hard," Electronic News (Jan. 31, 1994).

Convex Architecture Reference Manual, Sixth Edition (1992).

Convex Assembly Language Reference Manual, First Edition (Dec. 1991).

Convex 3400 Supercomputer System Overview (Jul. 24, 1991).

Convex Data Sheet, "C4/XA High–Performance Programming Environment," Convex Computer Corporation (1994).

Rubinfeld, et al., "Motion Video Instruction Extensions for Alpha" (Oct. 18, 1996).

"Alpha Architecture Reference Manual," Digital Equipment Corporation (1992).

Awaga et al., "The μVP 64–bit Vector Coprocessor: A New Implementation of High–Performance Numerical Computation," IEEE Micro, vol. 13, No. 5, pp. 24–36 (Oct. 1993).

Kimura et al., "Development of Gmicro 32–bit Family of Microprocessors, Fujitsu Semiconductor Special Collection," vol. 43, No. 2, pp. 89–97 (Feb. 1992).

Takahashi et al., "A 289 MFLOPs Single Chip Vector Processing Unit," The Institute of Electronics, Information, and Communication Engineers Technical Research Report, pp. 17–22 (May 28, 1992).

Uchiyama et al., "The Gmicro/500 Superscalar Microprocessor with Branch Buffers," IEEE Micro, pp. 12–21 (Oct. 1993).

Lee, "Accelerating Multimedia with Enhanced Microprocessors," IEEE Micro, vol. 15, No. 2, pp. 22–32 (Apr. 1995).

Undy et al., "A Low–Cost Graphics and Multimedia Workstation Chip Set," IEEE Micro, pp. 10–22 (Apr. 1994).

Asprey et al., "Performance Features of the PA7100 Microprocessor," IEEE Micro, pp. 22–35 (Jun. 1993).

Knebel et al., "HP's PA7100LC: A Low–Cost Superscalar PA–RISC Processor," IEEE, pp. 441–447 (1993).

Gwennap, "New PA–RISC Processor Decodes MPEG Video: HP's PA–7100LC Uses New Instructions to Eliminate Decoder Chip," Microprocessor Report (Jan. 24, 1994).

Kurpanek et al., "PA7200: A PA–RISC Processor with Integrated High Performance MP Bus Interface," IEEE COMPCON '94, pp. 375–382 (Feb. 28–Mar. 4, 1994).

Bass, "The PA 7100LC Microprocessor: A Case Study of IC Design Decisions in a Competitive Environment," Hewlett–Packard Journal, vol. 46, No. 2, pp. 12–22 (Apr. 1995).

Bowers et al., "Development of a Low–Cost, High Performance, Multiuser Business Server System," Hewlett–Packard Journal, vol. 46, No. 2, p. 79 (Apr. 1995).

Gwennap, "Digital, MIPS Add Multimedia Extensions," Microdesign Resources, pp. 24–28 (Nov. 18, 1996).

Lee et al., "Pathlength Reduction Features in the PA–RISC Architecture," IEEE COMPCON, pp. 129–135 (Feb. 24–28, 1992).

Lee et al., "Real–Time Software MPEG Video Decoder on Multimedia–Enhanced PA 7100LC Processors," Hewlett–Packard Journal, vol. 46, No. 2, pp. 60–68 (Apr. 1995).

Lee, "Realtime MPEG Video via Software Decompression on a PARISC Processor," IEEE, pp. 186–192 (1995).

Martin, "An Integrated Graphics Accelerator for a Low–Cost Multimedia Workstation," Hewlett–Packard Journal, vol. 46, No. 2, pp. 43–50 (Apr. 1995).

"HP 9000 Series 700 Workstations Technical Reference Manual: Model 712 (System)," Hewlett–Packard (Jan. 1994).

PA RISC 2.0 Architecture and Instruction Set Reference Manual, Hewlett–Packard (1995).

Case, "Low–End PA7100LC Adds Dual Integer ALUs," Microprocessor Report (Nov. 19, 1992).

Gwennap, "PA–8000 Combines Complexity and Speed," Microprocessor Report (Nov. 14, 1994).

Crawford, "The i486 CPU: Executing Instructions in One Clock Cycle," IEEE Micro (Feb. 1990).

"i486™ Processor Programmer's Reference Manual," Osborne McGraw–Hill (1990).

"Intel486™ Microprocessor Family Programmer's Manual," Intel Corp. (1995).

"Understanding x86 Microprocessors," MicroDesign Resources, 1993 [pp. 3–16 through 3–20, Wharton, Parallel 486 Pipelines Product Peak Processor Performance Microprocessor Report (Jun. 1989)].

Kohn et al., "Introducing the Intel i860 64 Bit Microprocessor," IEEE Micro, pp. 15–30 (Aug. 1989).

Grimes et al., "A New Processor with 3–D Graphics Capabilities," NCGA '89 Conference Proceedings vol. 1, pp. 275–284 (Apr. 17–20, 1989).

"Paragon User's Guide" (Oct. 1993).

Atkins, "Performance and the i860 Microprocessor," IEEE Micro, pp. 24–27, 72–78 (Oct. 1991).

Grimes et al., "The Intel i860 64–Bit Processor: A General–Purpose CPU with 3D Graphics Capabilities," IEEE Computer Graphics & Applications, pp. 85–94 (Jul. 1989).

Kohn et al., "A 1,000,000 Transistor Microprocessor," 1989 IEEE International Solid–State Circuits Conference Digest of Technical Papers, pp. 54–55, 290 (Feb. 15, 1989).

Kohn et al., "A New Microprocessor With Vector Processing Capabilities," Electro/89 Conference Record, pp. 1–6 (Apr. 11–13, 1989).

Kohn et al., "The i860 64–Bit Supercomputing Microprocessor," AMC, pp. 450–456 (1989).

Mittal et al., "MMX Technology Architecture Overview," Intel Technology Journal Q3 '97, pp. 1–12 (1997).

Patel et al., "Architectural Features of the i860—Microprocessor RISC Core and On–Chip Caches," IEEE, pp. 385–390 (1989).

Rhodehamel, "The Bus Interface and Paging Units of the i860 Microprocessor," IEEE, pp. 380–384 (1989).

Perry, "Intel's secret is out," IEEE Spectrum, pp. 22–28 (Apr. 1989).

Sit et al., "An 80 MFLOPS Floating–point Engine in the Intel i860 Processor," IEEE, pp. 374–379 (1989).

Intel Corporation, "i860 XP Microprocessor Data Book" (May 1991).

N12 Performance Analysis dated Sep. 21,1990.

Deposition of Leslie Kohn on Sep. 9, 2005; *MicroUnity Systems Engineering, Inc. v. Dell, Inc. f/k/a/ Dell Computer and Intel Corporation;* C.A. No. 2—4CV–120; In the United States District Court of the Eastern District of Texas, Marshall Division.

Padegs et al., "The IBM System/370 Vector Architecture: Design Considerations," IEEE (1988).

Moore et al., "Concepts of the System/370 Vector Architecture," ACM (1987).

Buchholz, "The IBM System/370 Vector Architecture," IBM Systems Journal, vol. 25, No. 1, 1986.

Tucker, "The IBM 3090 System: An Overview," IBM Systems Journal, vol. 25, No. 1, 1986.

Clark et al., "Vector System performance of the IBM 3090," IBM Systems Journal, vol. 25, No. 1, 1986.

Gibson et al., "Engineering and scientific processing on the IBM 3090," IBM Systems Journal, vol. 25, No. 1, 1986.

"Enterprise Systems Architecture/390: Vector Operations," IBM Corp., First Edition (Sep. 1991).

Ide et al., "A 320–MFLOPS CMOS Floating–Point Processing Unit for Superscalar Processors," IEEE Journal of Solid–State Circuits, vol. 28, No. 3, pp. 352–361 (Mar. 1993).

Ide et al., "A 320 MFLOPS CMOS Floating–Point Processing Unit for Superscalar Processors," IEEE 1992 Custom Integrated Circuits Conference, 1992.

"Illiac IV Quarterly Progress Report: Oct., Nov., Dec. 1969," Illiac IV Document No. 238, Department of Computer Science, University of Illinois at Urbana–Champaign (Jan. 15, 1970).

"Illiac IV Systems Characteristics and Programming Manual," Institute for Advanced Computation, Ames Research Center, NASA (Jun. 1, 1972).

Knapp et al., "Bulk Storage Applications in the Illiac IV System," Illiac IV Document No. 250, Center for Advanced Computation, University of Illinois at Urbana–Champaign (Aug. 3, 1971).

Abel et al., "Extensions to FORTRAN for Array Processing," Illiac IV Document No. 235, Department of Computer Science, University of Illinois at Urbana–Champaign (Sep. 1, 1970).

Barnes et al., "The Illiac IV Computer," IEEE Transactions on Computers, vol. C–17, No. 8, pp. 746–757 (Aug. 1968).

"Multimedia Extension Unit for the X86 Architecture," Compaq Computer Corp., Revision 0.8b (Jun. 20, 1995).

"Multimedia Extension Unit for the X86 Architecture," Compaq Computer Corp., Revision 0.9 (Jul. 31, 1995).

"Multimedia Extension Unit for the X86 Architecture," Compaq Computer Corp., Revision 0.6b (May 26, 1995).

Gwennap, "Nx686 Goes Toe–to–Toe with Pentium Pro," Microprocessor Report (Oct. 23, 1995).

Silicon Graphics Introduces Enhanced MIPS—Architecture to Lead the Interactive Digital Revolution, Silicon Graphics Press Release (Oct. 21, 1996).

MDMX Digital Media Extension, MIPS.

Gwennap, "Digital, MIPS Add Multimedia Extensions," Microprocessor Report (Nov. 18, 1996).

"MIPS R4000 User's Manual," MIPS Computer Systems, Inc. (1991).

"MIPS R4000 Microprocessor User's Manual: Second Edition," MIPS Technologies, Inc. (1994).

Shanley, Tom, Pentium Pro Processor System Architecture, MindShare, Inc., Addison–Wesley Developers Press (1997).

Intel MMX Technology Overview (Mar. 1996).

"Intel Architecture MMX TM Technology: Programmer's Reference Manual," Intel Corp, (Mar. 1996).

Gwennap, "Intel's MMX Speeds Multimedia," Microprocessor Report (Mar. 5, 1996).

Diefendorff et al., "Organization of the Motorola 88110 Superscalar RISC Microprocessor," IEEE Micro, © IEEE 1992, pp. 40–63.

MC 88110 Second Generation RISC Microprocessor User's Manual published in 1991.

Gipper, "Designing Systems for Flexibility, Functionality, and Performance with the 88110 Symmetric Superscalar Microprocessor," IEEE (1992).

Papadopoulos et al., "*T: Integrated Building Blocks for Parallel Computing," ACM, pp. 624–635 (1993).

Beckerle, "Overview of the START (*T) Multithreaded Computer," IEEE COMPCON, pp. 148–156 (Feb. 22–26, 1993).

Ang. "StarT Next Generation: Integrating Global Caches and Dataflow Architecture," Proceedings of the ISCA 1992 Dataflow Workshop (1992).

Diefendorff et al., "The Motorola 88110 Superscalar RISC Microprocessor," IEEE, pp. 157–162 (1992).

Nikhil et al., "*T: A Multithreaded Massively Parallel Architecture," Computation Structures Group Memo 325–2, Laboratory for Computer Science, Massachusetts Institute of Technology (Mar. 5, 1992).

Patterson, "Motorola Announces First High Performance Single Board Computer Using Superscalar Chip," Motorola Computer Group (1992).

Shipnes, "Graphics Processing with the 88110 RISC Microprocessor," IEEE COMPCON, pp. 167–174 (Feb. 24–28, 1992).

Lowney et al., "The Multiflow Trace Scheduling Compiler," published Oct. 30, 1992.

Colwell et al., "A VLIW Architecture for a Trace Scheduling Compiler," IEEE Transactions on Computers, Aug. 1988.

Colwell et al., "Architecture and Implementation of a VLIW Supercomputer," IEEE, published in 1990.

"BIT Product Summary: B3110/B3120/B2110/B2120 Floating Point Chip Set," Bipolar Integrated Technology, Inc., published Dec. 1986.

"TRACE/300 Series: F Board Architecture," Multiflow Computer, Dec. 9, 1988.

N15 External Architecture Specification dated Dec. 14, 1990.

N15 Product Requirements Document dated Dec. 21, 1990.

N15 Product Implementation Plan dated Dec. 21, 1990.

N15 External Architecture Specification (EAS) dated Oct. 22, 1990.

N15 Micro Architecture Specification dated Apr. 30, 1991.

Broomell et al., "Classification Categories and Historical Development of Circuit Switching Topologies," Computing Surveys, vol. 15, No. 2, pp. 95–133 (Jun. 1983).

Watkins et al., "A Memory Controller with an Integrated Graphics Processor," IEEE pp. 324–336 (1993).

Iwaki, "Architecture of a High Speed Reed Solomon Decoder," IEEE Consumer Electronics (Jan. 1994).

Le–Ngoc, "A Gate–Array–Based Programmable Reed–Solomon Codec: Structure–Implementation–Applications," IEEE Military Communications (1990).

Eisig, "The Design of a 64–bit Integer Multiplier/Divider Unit" (1993).

Feng, "Data Manipulating Functions in Parallel Processors and Their Implementations," IEEE Transactions on Computers (Mar. 1974).

Tullsen et al., "Simultaneous Multithreading: Maximizing On–Chip Parallelism," Proceedings of the 22nd Annual International Symposium on Computer Architecture (Jun. 1995).

Culler et al., "Analysis Of Multithreaded Microprocessors Under Multiprogramming," Report No. UCB/CSD 92/687 (May 1992).

Laudon et al., "Architectural And Implementation Tradeoffs In The Design Of Multiple–Context Processors," CSL–TR–92–523 (May 1992).

Kuck, "The Structure of Computers and Computation: vol. 1," John Wiley & Sons, Inc. (1978).

Arnould et al., "The Design of Nectar: A Network Backplane for Heterogeneous Multicomputers," ACM (1989).

Bell, "Ultracomputers: A Teraflop Before its Time," Comm.'s of the ACM (Aug. 1992) pp. 27–47.

Donovan et al., "Pixel Processing in a Memory Controller," IEEE Computer Graphics and Applications, pp. 51–61 (Jan. 1995).

Fields, "Hunting for Wasted Computing Power: New Software for Computing Networks Puts Idle PC's to Work," Univ. of Wisconsin—Madison (1993).

Geist, "Cluster Computing: The Wave of the Future?," Oak Ridge National Laboratory, 84OR21400 (May 30, 1994).

Ghafoor, "Systolic architecture for finite field exponentiation," IEEE Proceedings, vol. 136 (Nov. 1989).

Giloi, "Parallel Programming Models and Their Interdependence with Parallel Architectures," IEEE Proceedings (Sep. 1993).

Hwang et al., "Parallel Processing for Supercomputers & Artificial Intelligence" (1993).

Hwang, "Advanced Computer Architecture: Parallelism, Scalability, Programmability," (1993).

Hwang, "Computer Architecture and Parallel Processing," McGraw Hill (1984).

Jain, "Square–Root, Reciprocal, Sine/Cosine, Arctangent Cell for Signal and Image Processing," IEEE ICASSP'94, pp. II–521–II–524 (Apr. 1994).

Kissell, "The Dead Supercomputer Society—The Passing of A Golden Age?," www.paralogos.com/DeadSuper/ (1998).

Lawrie, "Access and Alignment of Data in an Array Processor," IEEE Transactions on Computers, vol. c–24, No. 12, pp. 99–109 (Dec. 1975).

Litzkow et al., "Condor—A Hunter of Idle Workstations," IEEE (1988).

Markstein, "Computation of Elementary Functions on the IBM RISC System/6000 Processor," IBM J. Res. Develop., vol. 34, No. 1, pp. 111–119 (Jan. 1990).

Nienhaus, "A Fast Square Rooter Combining Algorithmic and Lookup Table Techniques," IEEE Proceedings Southeastcon, pp. 1103–1105 (1989).

Renwick, "Building a Practical HIPPI LAN," IEEE pp. 355–360 (1992).

Rohrbacher et al., "Image Processing with the Staran Parallel Computer," IEEE Computer, vol. 10, No. 8, pp. 54–59 (Aug. 1977) (reprinted version pp. 119–124).

Ryne, "Advanced Computers and Simulation," IEEE, pp. 3229–3233 (1993).

Siegel, "Interconnection Networks for SIMD Machines," IEEE Computer, vol. 12, No. 6 (Jun. 1979) (reprinted version pp. 110–118).

Singh et al., "A Programmable HIPPI Interface for a Graphics Supercomputer," ACM (1993).

Smith, "Cache Memories," Computing Surveys, vol. 14, No. 3 (Sep. 1982).

Tenbrink et al., "HIPPI: The First Standard for High–Performance Networking," Los Alamos Science (1994).

Toyokura, "A Video DSP with a Macroblock–Level–Pipeline and a SIMD Type Vector–Pipeline Architecture for MPEG2 CODEC," ISSCC94, Section 4, Video and Communications Signal Processors, Paper WP 4.5, pp. 74–75 (1994).

Vetter et al., "Network Supercomputing," IEEE Network (May 1992).

Wang, "Bit–Level Systolic Array for Fast Exponentiation in $GF(2^m)$," IEEE Transactions on Computers, vol. 43, No. 7, pp. 838–841 (Jul. 1994).

Ware et al., "64 Bit Monolithic Floating Point Processors," IEEE Journal Of Solid–State Circuits, vol. Sc–17, No. 5 (Oct. 1982).

"Bit Manipulator," IBM Technical Disclosure Bulletin, pp. 1575–1576 (Nov. 1974).

"Using a Common Barrel Shifter for Operand Normalization, Operand Alignment and Operand Unpack and Pack in Floating Point," IBM Technical Disclosure Bulletin, pp. 699–701 (Jul. 1986).

"Computational Science: Advances Through Collaboration," San Diego Supercomputer Center 1993 Science Report (1993).

High Performance Computing & Communications: Toward a National Information Infrastructure, "National Science Foundation (NSF)" (1994).

National Coordination Office for High Performance Computing and Communications, "High Performance Computing and Communications: Foundation for America's Information Future" (1996).

"The History of the Development of Parallel Computing," http://punch.purdue.edu (1994).

IEEE Standard for Binary Floating–Point Arithmetic, Std IEEE754–1985, © 1985.

* cited by examiner

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 10, 11, 13 and 20 are determined to be patentable as amended.

Claims 2, 4–9, 12 and 14–19, dependent on an amended claim, are determined to be patentable.

1. A controller for a synchronous DRAM comprising:
   a sorting unit for receiving memory requests and sorting said memory requests based on their addresses, wherein said memory requests are tagged for indicating a sending order thereof before said memory requests are sent to said sorting unit *and wherein the sending order represents an order in which said memory requests are provided by a processor*;
   a throughput maximizing unit for processing said memory requests *and sending them* to the synchronous DRAM *out of an order in which they are received by the sorting unit*, in response to scheduling which maximizes the use of data slots by the synchronous DRAM.

3. A controller for a synchronous DRAM comprising:
   a sorting unit for receiving *tagged* memory requests and sorting said memory requests based on their address, *wherein the tags associated with said memory requests indicate an order in which said memory requests are provided by a processor and received by the controller*;
   a throughput maximizing unit for processing said memory requests *and sending them* to the synchronous DRAM *out of an order received by the sorting unit*, in response to scheduling which maximizes the use of data slots by the synchronous DRAM; and
   a control block for receiving a controller clock signal and developing an SDRAM clock signal by dividing said controller clock signal with a programmable divisor value.

10. A system for interfacing a [processing device] *processor* with a synchronous DRAM comprising:
    means for developing memory requests from the [processing device] *processor*;
    means for tagging said memory requests to indicate the order in which they are provided by the [processing device] *processor*; and
    a controller for maximizing throughput of said memory requests from the [processing device] *processor* to the synchronous DRAM *and sending them out of the order based on scheduling constraints of the synchronous DRAM and arbitrating between conflicting memory requests so that data slots used by the synchronous DRAM are maximized*.

11. A method for controlling a synchronous DRAM comprising the steps of:
    (a) receiving memory requests and sorting said memory requests based on their addresses;
    (b) tagging said memory requests to indicate a sending order thereof *by a processor* before said memory requests are received at said step (a); and
    (c) maximizing throughput of said memory requests *by transmitting them out of the sending order* to the synchronous DRAM so that use of data slots by the synchronous DRAM is maximized.

13. A method for controlling a synchronous DRAM comprising the steps of:
    (a) receiving *tagged* memory requests *from a processor* and sorting said memory requests based on their addresses, *wherein the tags associated with said memory requests indicate an order in which such memory requests are received from the processor*;
    (b) maximizing throughput of said memory requests *by transmitting them out of the received order,* to the synchronous DRAM so that use of data slots by the synchronous DRAM is maximized; and
    (c) receiving a controller clock signal and developing an SDRAM clock signal by dividing said controller clock signal with a programmable divisor value.

20. A method for interfacing a [processing device] *processor* with a synchronous DRAM, comprising the steps of:
    (a) developing memory requests from the [processing device] *processor*;
    (b) tagging said memory requests to indicate the order in which they are provided by the [processing device] *processor*; and
    (c) maximizing throughput of said memory requests from the [processing device] *processor* to the synchronous DRAM *by transmitting them out of the order provided* based on scheduling constraints of the synchronous DRAM and arbitrating between conflicting memory requests so that the data slots used by the synchronous DRAM are maximized.

* * * * *